United States Patent
Otsuka

(10) Patent No.: US 7,233,847 B2
(45) Date of Patent: Jun. 19, 2007

(54) SENSOR SYSTEM

(75) Inventor: Yuzuru Otsuka, Kariya (JP)

(73) Assignee: DENSO Corporation, Kariya (JP)

( * ) Notice: Subject to any disclaimer, the term of this patent is extended or adjusted under 35 U.S.C. 154(b) by 287 days.

(21) Appl. No.: 11/081,603

(22) Filed: Mar. 17, 2005

(65) Prior Publication Data

US 2005/0222743 A1  Oct. 6, 2005

(30) Foreign Application Priority Data

Mar. 30, 2004  (JP) .............................. 2004-100997

(51) Int. Cl.
*G06F 19/00* (2006.01)
(52) U.S. Cl. ..................... 701/34; 701/63; 702/116
(58) Field of Classification Search ............. 701/29, 701/34, 63; 702/58, 116; 340/438
See application file for complete search history.

(56) References Cited

U.S. PATENT DOCUMENTS

| | | | | |
|---|---|---|---|---|
| 3,874,743 A * | 4/1975 | Fleischer et al. | ...... | 303/122.05 |
| 4,233,599 A * | 11/1980 | Brearley | ...... | 340/679 |
| 4,918,606 A * | 4/1990 | Ito et al. | ...... | 701/63 |
| 5,406,485 A * | 4/1995 | Wise et al. | ...... | 701/29 |
| 5,476,311 A * | 12/1995 | Fennel et al. | ...... | 303/122.06 |
| 5,517,431 A * | 5/1996 | Pattantyus et al. | ...... | 702/116 |
| 6,223,107 B1 * | 4/2001 | Mergenthaler et al. | ...... | 701/34 |
| 6,625,527 B1 | 9/2003 | Ding et al. | | |
| 7,107,134 B1 * | 9/2006 | Melby et al. | ...... | 701/51 |
| 2005/0216149 A1 * | 9/2005 | Kato | ...... | 701/29 |

* cited by examiner

*Primary Examiner*—Gary Chin
(74) *Attorney, Agent, or Firm*—Posz Law Group, PLC

(57) ABSTRACT

A vehicular angular velocity sensor system executes abnormality detection of angular velocity sensors based on comparison between output states of corresponding angular velocity signals. The sensor system includes first low-pass filters and second low-pass filters for the two angular velocity sensors, respectively. Each of the first low-pass filter has a first cut-off frequency to remove components of a high frequency band unnecessary for vehicular control, from angular velocity signals. In contrast, each of the second low-pass filters has a second cut-off frequency that is lower than the first cut-off frequency of the first low-pass filter. Low-frequency-side angular velocity signals that have passed through the second low-pass filters are used for executing the abnormality detection.

10 Claims, 8 Drawing Sheets

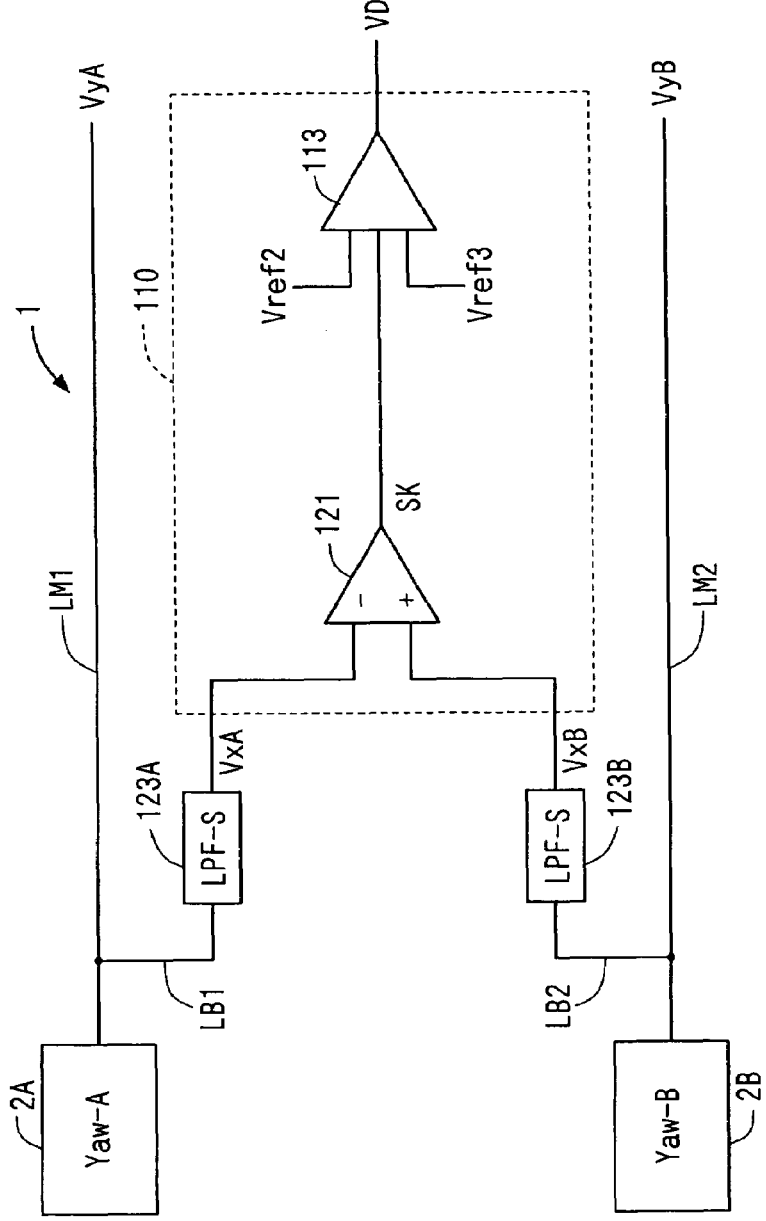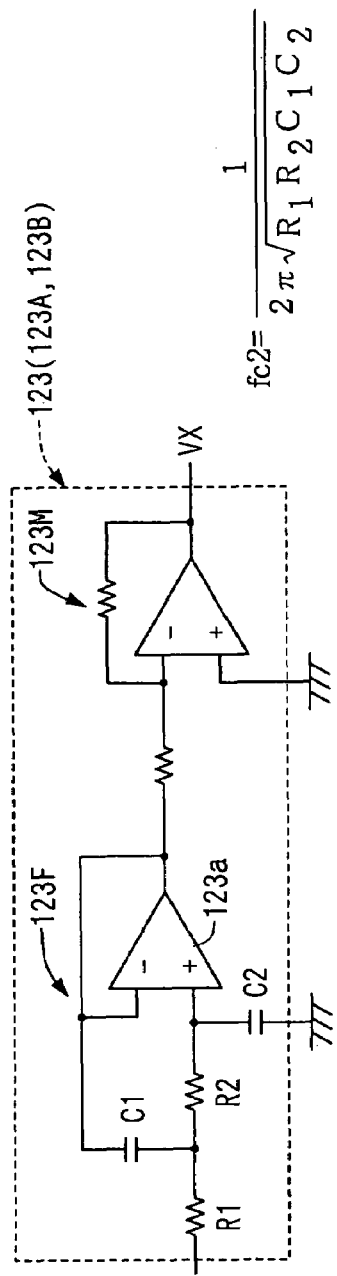
FIG. 1A
FIG. 1B

SENSOR SYSTEM

CROSS REFERENCE TO RELATED APPLICATIONS

This application is based on and incorporates herein by reference Japanese Patent Application No. 2004-100997 filed on Mar. 30, 2004.

FIELD OF THE INVENTION

The present invention relates to a vehicular angular velocity sensor system.

BACKGROUND OF THE INVENTION

There is a vehicular control system using an angular velocity sensor. The vehicular control system includes a vehicular stability control system that maintains a vehicle in a normal state by detecting sideways skids and thereby properly controlling brakes or torques of wheels. The vehicular control system further includes four-wheel steering-angle control system that controls steering angles of front or rear wheels. These vehicular control systems detect vehicular abnormal states such as skids using signals of the angular velocity sensor, so enhancement in reliability of the signals of the angular velocity sensor is required.

Many of the sensors for vehicular control are provided redundantly as hardware components for enhancing their reliability. Namely, the hardware structure includes two or more same sets of the sensors. Here, two outputs of the two sets of the sensors are monitored in differences with each other to thereby detect their failure.

Further, the angular velocity sensors include individual deviations from others with respect to their detection sensitivity or zero-point offset, so threshold values for detecting the failure have to be set to include margins that absorb the deviations. Sensitivity errors or zero-point offset errors can be detected without problems while the outputs of the angular velocity sensors significantly exceed the threshold values. In contrast, minor failures that slightly vary the angular velocity signal level cannot be detected.

To deal with this issue, Patent Document 1 describes addition of a differentiation circuit, which differentiates outputs of the angular velocity sensor on a time basis, to thereby additionally monitor the differentiated signals for enhancing accuracy of failure diagnosis.

Patent Document 1: JP-2002-537549A (WO00/48883, U.S. Pat. No. 6,625,527 B1)

However, this failure monitoring using the differentiation circuit requires addition of the circuit and also needs to process the differentiated signals in addition to the usual angular velocity signals, so this monitoring poses a disadvantage of increase in loads to process signal.

For instance, when a yaw rate is slightly generated during traveling on an expressway, the level of the angular velocity signal significantly decreases. It thereby becomes difficult to detect the sensitivity errors even using the differentiated signals. Further, since the differentiation circuit increases gains as the frequency increases, differentiated angular velocity signals are apt to receive influence of resonance due to a sensor's mechanical structure. This can be also a cause for making it difficult to detect the sensitivity errors.

SUMMARY OF THE INVENTION

It is an object of the present invention to provide an angular velocity sensor system capable of solving the above problems. Namely, the system can effectively detect sensitivity errors of angular velocity sensors without excessively increasing loads in signal processing. The system can further securely detect failures or abnormality even when an output level of an angular velocity signal is low during high-speed traveling.

To achieve the above object, an angular velocity sensor system in a vehicle is provided with the following. At least two angular velocity sensors are included for individually outputting angular velocity signals. Abnormality detection of the angular velocity sensors is executed based on comparison between states of the outputted angular velocity signals. A first low-pass filter is included before an angular velocity signal of each of the angular velocity sensors is outputted. Here, the first low-pass filter includes a first cut-off frequency and removes, from an angular velocity signal, a high-frequency-side component unnecessary for vehicular control. A second low-pass filter is included to have a second cut-off frequency lower than the first cut-off frequency. An output unit is included for outputting an angular velocity signal, which has passed through the first low-pass filter and has not passed through the second low-pass filter. An abnormality-detection processing unit is included for executing the abnormality detection using a low-frequency-side angular velocity signal that has passed through the second low-pass filter to thereby decrease its component whose frequency is between the first cut-off frequency and the second cut-off frequency.

In this structure, noises in an accidental angular velocity region can be effectively removed from angular velocity signals in a usual angular velocity region. Even when the levels of the generated angular velocity signals become low, in particular, in high-speed traveling or snowy-road traveling, sensitivity errors or zero-point offset errors can be securely detected.

BRIEF DESCRIPTION OF THE DRAWINGS

The above and other objects, features, and advantages of the present invention will become more apparent from the following detailed description made with reference to the accompanying drawings. In the drawings:

FIG. 1A is a block diagram of an angular velocity sensor system according to a first embodiment of the present invention;

FIG. 1B is a diagram of a second low-pass filter in an angular velocity sensor system according to the first embodiment;

DETAILED DESCRIPTION OF THE PREFERRED EMBODIMENTS

First Embodiment

An angular velocity sensor system 1 according to a first embodiment of the present invention is mounted in a subject vehicle for use in vehicle control. As shown in FIG. 1A, the angular velocity sensor system 1 includes multiple angular velocity sensors 2A, 2B (two sensors (Yaw-A, Yaw-B in FIG. 1A) are provided in this embodiment) that can individually output angular velocity signals VyA, VyB. The angular velocity sensor system 1 executes an abnormality detection process based on comparison between the output states of the angular velocity signals VyA, VyB.

Figure 3:
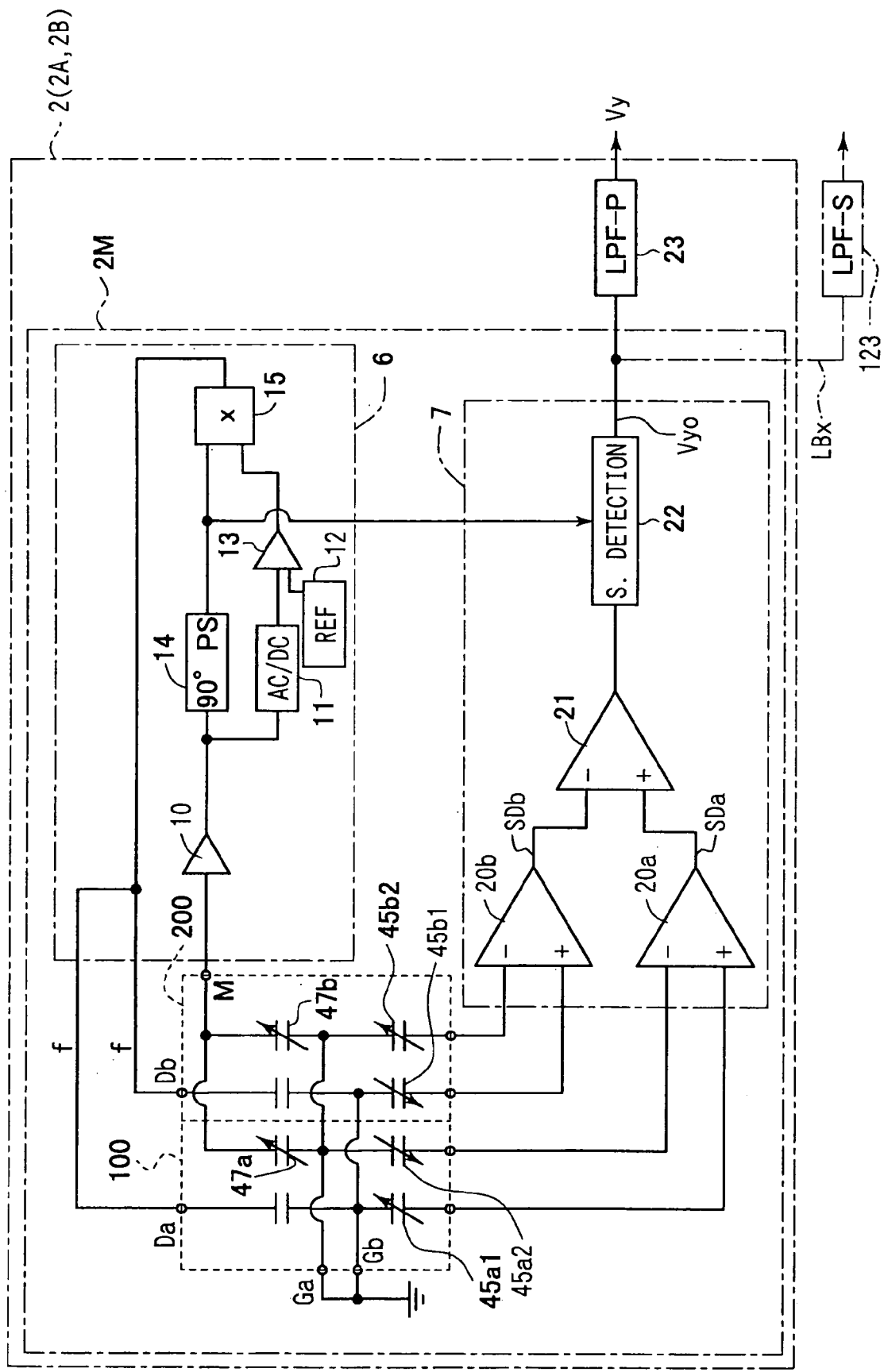
FIG. 3 is a circuit diagram of an electrical structure of an angular velocity sensor.

The angular velocity sensors 2A, 2B have hardware structures equivalent to each other. This hardware structure is shown in FIG. 3. Hereinbelow, an angular velocity sensor 2 represents either of the angular velocity sensors 2A, 2B. The angular velocity sensor 2 is formed as an angular velocity sensor of a vibrating type whose main portion 2M includes a first and a second sensor units 100, 200, a vibration-driving control unit 6, and an angular-velocity detection unit 7.

Figure 4:
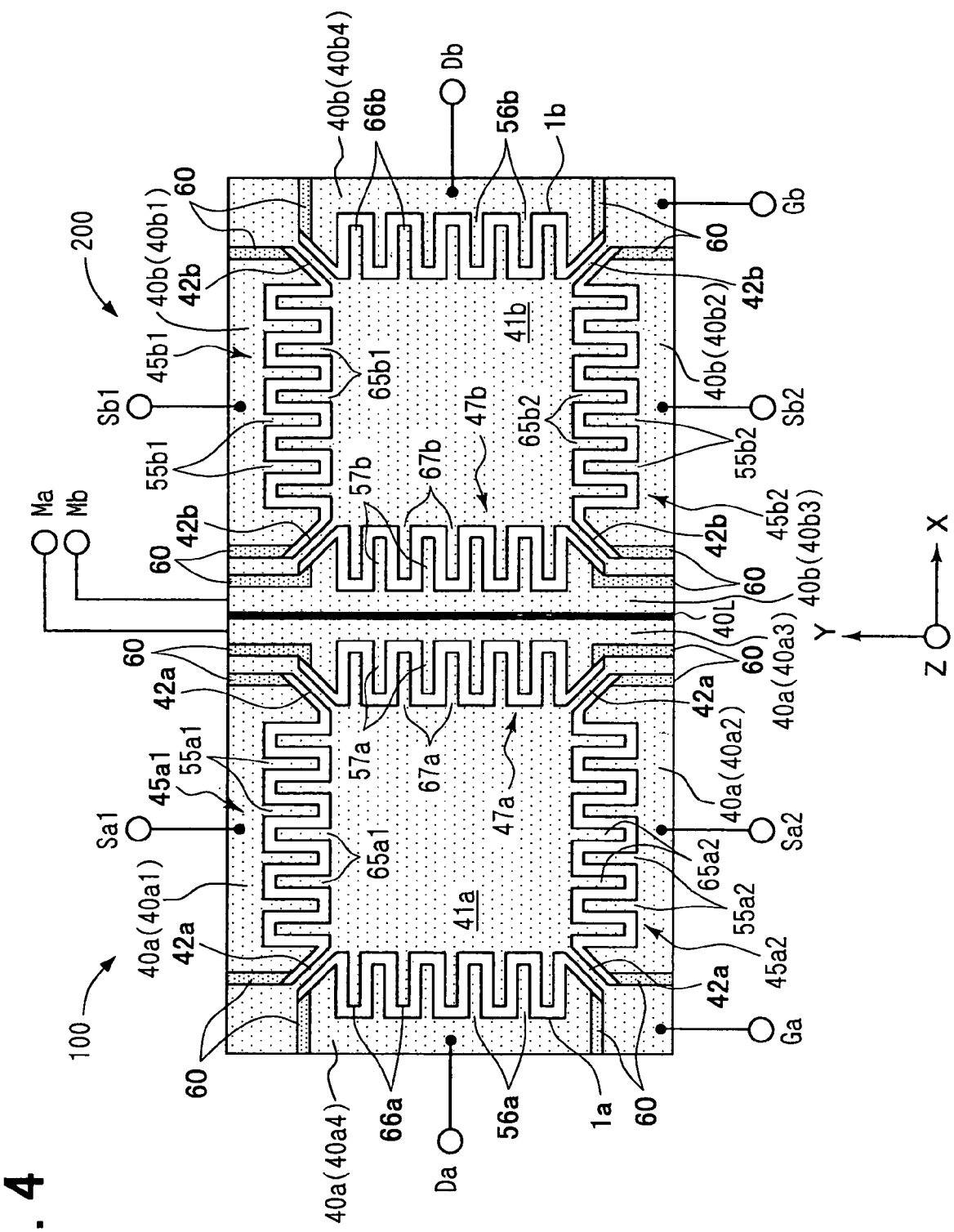
FIG. 4 is a schematic view of an internal structure of an angular velocity sensor.

As shown in FIG. 4, each sensor unit 100, 200 includes a vibrating element 41a, 41b that is a central portion, and a frame 40a, 40b that is a peripheral portion surrounding the vibrating element 41a, 41b. The vibrating element 41a, 41b vibrates in X axis (reference direction, vibration driving direction). Here, the frames 40a, 40b are united in a center line 40L in FIG. 4. Each sensor unit 100, 200 detects a detection-subject component vibrating in Y axis (angular-velocity detection direction) perpendicular to X axis when an angular velocity is applied to the vibrating elements 41a, 41b. Vibrating waveforms of a detection subject are formed by superimposing an acceleration waveform component on an angular velocity waveform component, when translational acceleration is applied. The first sensor unit 100 and the second sensor unit 200 provide reverse-phase vibrating driving to the vibrating elements 41a, 41b. The above reference direction and the angular-velocity detection direction are determined for enabling the following. Namely, the detection-subject vibrating waveforms of the vibrating elements 41a, 41b mutually have the same phase in one of the angular velocity waveform component and the acceleration waveform component superimposed on the angular velocity waveform component, and the reverse phase in the other of them. Either of them can be thereby cancelled by addition or subtraction. In this embodiment, both sensor units 100, 200 adjoin in X axis, while the vibrating elements 41a, 41b are driven by being vibrated in a mirroring symmetrical relationship. However, this relationship of this embodiment does not need to be limited within the scope of the present invention.

A vibration unit is formed, for instance, using a technology of micro-machining for a semiconductor (e.g., Si). In FIG. 4, the vibrating elements 41a, 41b of the sensor units 100, 200 connect towards the frames 40a, 40b, via beams 42a, 42b, respectively. Here, the vibrating elements 41a, 41b are able to independently vibrate in X axis and in Y axis, with respect to the frames 40a, 40b, respectively.

Each of the sensor unit 100, 200 includes four comb-shape electrode pairs along the mutual facing areas of the vibrating element 41a, 41b and the frame 40a, 40b.

A first pair is a driving-side fixed electrode 56a, 56b and a driving-side movable electrode 66a, 66b, near the far end side in X axis of the sensor unit 100, 200 from the center line 40L in FIG. 4. The driving-side fixed electrode 56a, 56b is located in an inner area of the far end frame 40a4, 40b4. The driving-side movable electrode 66a, 66b is located in the far end side in X axis of the vibrating element 41a, 41b. The comb-shape driving-side fixed electrode 56a, 56b and the comb-shape driving-side movable electrode 66a, 66b are arranged in Y axis with constant intervals while their electrode units extending in X axis alternated with each other, as shown in FIG. 4.

Second and third pairs are vibration-detection-side fixed electrodes 55a1, 55a2, 55b1, 55b2 and vibration-detection-side movable electrodes 65a1, 65a2, 65b1, 65b2 near both end sides in Y axis of the sensor unit 100, 200. The vibration-detection-side fixed electrodes 55a1, 55a2, 55b1, 55b2 are located in inner areas of the upper and lower frames 40a1, 40a2, 40b1, 40b2. The vibration-detection-side movable electrodes 65a1, 65a2, 65b1, 65b2 are located in the upper and lower sides of the vibrating element 41a1, 41a2, 41b1, 41b2. The comb-shape fixed electrode 55a1, 55a2, 55b1, 55b2 and the come-shape movable electrode 65a1, 65a2, 65b1, 65b2 are arranged in X axis with constant intervals while their electrode units extending Y axis alternated with each other, as shown in FIG. 4. Further, the fixed electrode 55a1, 55a2, 55b1, 55b2 and the movable electrode 65a1, 65a2, 65b1, 65b2 constitute upper and lower vibration-detection capacitors 45a1, 45a2, 45b1, 45b2 of the sensor unit 100, 200. Here, the opposing capacitors 45a1 and 45a2, or the opposing capacitors 45b1 and 45b2 have mutually opposite phases in the angular-velocity waveform component and the acceleration waveform component.

A fourth pair is a monitor-side fixed electrode 57a, 57b and a monitor-side movable electrode 67a, 67b near the center line 40L. The monitor-side fixed electrode 57a, 57b is located in an inner area of the frame 40a3, 40b3 adjacent to the center line 40L. The monitor-side movable electrode 67a, 67b is located in the central side in X axis of the vibrating element 41a, 41b. The comb-shape monitor-side fixed electrode 57a, 57b and the come-shape monitor-side movable electrode 67a, 67b are arranged in Y axis with constant intervals while their electrode units extending X axis alternated with each other, as shown in FIG. 4. Further, the fixed electrode 57a, 57b and the movable electrode 67a, 67b constitute a vibration-monitor capacitor 47a, 47b for feedback controlling of driving vibration numbers.

Next, allocation of terminals will be explained below. The vibrating element 41a, 41b and the electrodes 65a1, 65a2, 66a, 67a, 65b1, 65b2, 66b, 67b that are formed on the vibrating element 41a, 41b interface with a grounding terminal Ga, Gb via the beams 42a, 42b and the frames 40a, 40b to be grounded outside. On the surface of the frame 40a, 40b, a driving terminal Da, Db, acceleration-waveform detection terminal Sa1, Sa2, Sb1, Sb2, and vibration-monitor terminal M (Ma, Mb) are allocated. The driving terminal Da, Db is connected to the driving-side fixed electrode 56a, 56b. The acceleration-waveform detection terminal Sa1, Sa2, Sb1, Sb2 is connected to the detection-side fixed electrodes 55a1, 55a2, 55b1, 55b2. The vibration-monitor terminal M (Ma, Mb) is connected to the monitor-side fixed electrode 57a, 57b. These terminals are electrically isolated mutually by isolating portions 60.

Referring to FIG. 3, the main portion 2M of the angular velocity sensor 2 further includes an angular-velocity detection unit 7 and a vibration-driving control unit 6.

The angular-velocity detection unit 7 includes charge-voltage converters 20a, 20b, a differential amplifier 21, and a synchronous wave-detection unit 22. The charge-voltage converter 20a, 20b formed of a charge amplifier connects to the capacitors 45a1, 45a2, 45b1, 45b2 to convert accumulated charge due to the vibration detection to voltage, and outputs it as voltage waveforms. The differential amplifier 21 as a differential waveform computation unit then differentially amplifies outputs of the charge-voltage converters 20a, 20b. The synchronous wave-detection unit 22 extracts an acceleration component in a previously set frequency band.

The vibration-driving control unit 6 includes a charge-voltage converter 10, an AC/DC converter 11, a reference-voltage generator 12, a differential amplifier 13, a phase shifter 14, and a multiplier 15. The charge-voltage converter 10 converts the accumulated charge of the capacitors 47a, 47b to vibrating alternate-current voltage outputs. The AC/DC converter 11 then converts the alternate-current voltage outputs to direct-current voltages. The reference-voltage generator 12 provides a reference voltage Vref by treating the direct-current voltages as an amplification monitor value. The differential amplifier 13 amplifies difference between the amplification monitor value and the reference voltage Vref. The phase shifter 14 shifts by 90-degree the phase of the vibrating voltage output from the charge-voltage converter 10. The multiplier 15 multiplies the outputs of the differential amplifier 13 and the phase shifter 14 together. Therefore, outputs of the multiplier 15 are inputted as vibration-driving voltage waveforms to the respective driving terminals Da, Db.

Under the above structure of the vibration-driving control unit 6, the vibration-driving control unit 6 constitutes a self-excited vibration-driving mechanism. Namely, the X-axis vibration of the vibrating element 41a, 41b is outputted as the vibration monitor signals from the monitor terminal M by capacity changes of the amplification monitor capacitor 47a, 47b. The outputted signals are converted to the voltage signals by the charge-voltage converter 10, and then returned to the driving terminals Da, Db. The phase shifter 14 maintains mechanical vibration at the resonant point of the vibrating elements 41a, 41b via the beams 42a, 42b. The vibration monitor signals from the charge-voltage converter 10 are smoothed by the AC/DC converter 11 to be converted to amplification level signals. The differential amplifier 13 computes the difference between the amplification level signals and reference voltage signals corresponding to the amplification level signals, from the reference voltage generator 12. The output of the differential amplifier 13 is multiplied as the amplification correction signals by the vibration monitor signals by the multiplier 15 to thereby control the driving amplification at a constant. Here, the driving output enters, in the same phase, the driving terminals Da, Db that are disposed in the opposing far ends in X axis with respect to the frame 40. Therefore, the vibrating elements 41a, 41b are driven by vibrations having phrases opposed to each other in X axis with the resonant frequency.

Under the above state, when an angular velocity in Z axis perpendicular to both X and Y axes is inputted, Coriolis Force is generated. Because of Coriolis Force, angular velocity components in Y axis with amplifications corresponding to the magnitude of the angular velocity are generated in the vibrating elements 41a, 41b. Here, angular velocity components are generated in the vibrating elements 41a, 41b in phases opposite to each other. The vibrations are detected as capacity changes of the capacitors 45a1, 45a2, 45b1, 45b2 and drawn out via the terminals Sa1, Sa2, Sb1, Sb2 to the charge-voltage converters 20a, 20b. The charge-voltage converters 20a, 20b converts the outputs to the angular velocity detection waveforms SDa, SDb.

Here, the capacitors 45a1, 45a2 or the capacitors 45b1, 45b2 exhibiting mutually opposite-phased angular velocities and accelerations are connected to the charge-voltage converter 20a or the charge-voltage converter 20b, respectively, so that differential input can be achieved. Namely, the same-phase combination can be achieved to thereby enhance the detection sensitivity for the angular velocity.

Next, the charge-voltage converters 20a, 20b output the angular-velocity detection waveforms SDa, SDb having phases opposite to each other. The differential amplifier 21 then executes difference computation to the waveforms SDa, SDb. Therefore, two waveforms SDa, SDb are added up with respect to the amplifications, so the detection sensitivity can be more enhanced. Further, in the sensor units 100, 200, when the angular velocity is applied in Z axis, Coriolis Force is detected in both opposite directions in Y axis. Translational acceleration in Y axis due to rotational centrifugal force or sudden vibration is detected in the same direction, so it can be recognized as noise in the angular velocity signal. However, the angular-velocity detection waveforms of both units 100, 200 are differentially computed, so that the acceleration components can be cancelled and only the angular velocity signals can be outputted.

The output of the angular velocity signals that is amplification modulated from the differential amplifier 21 is demodulated by the synchronous wave-detection unit 22 to be outputted as direct-current signal Vyo proportional to the inputted angular velocity. The reference frequency signal is diverted from the vibration monitor signal from the phase shifter 14. Coriolis Force is generated in proportion to a vector product of the velocity of the vibrating element and the applied angular velocity, so detection waveform of Coriolis Force is detected in a 90-degree advance. Therefore, the driving vibration waveforms advanced by 90 degrees by the phase shifter 14 accords with the phase of the detection waveforms of Coriolis Force (i.e., angular velocity waveform), so that they can be properly used for the reference frequency signals for the synchronous wave-detection.

Figure 2:
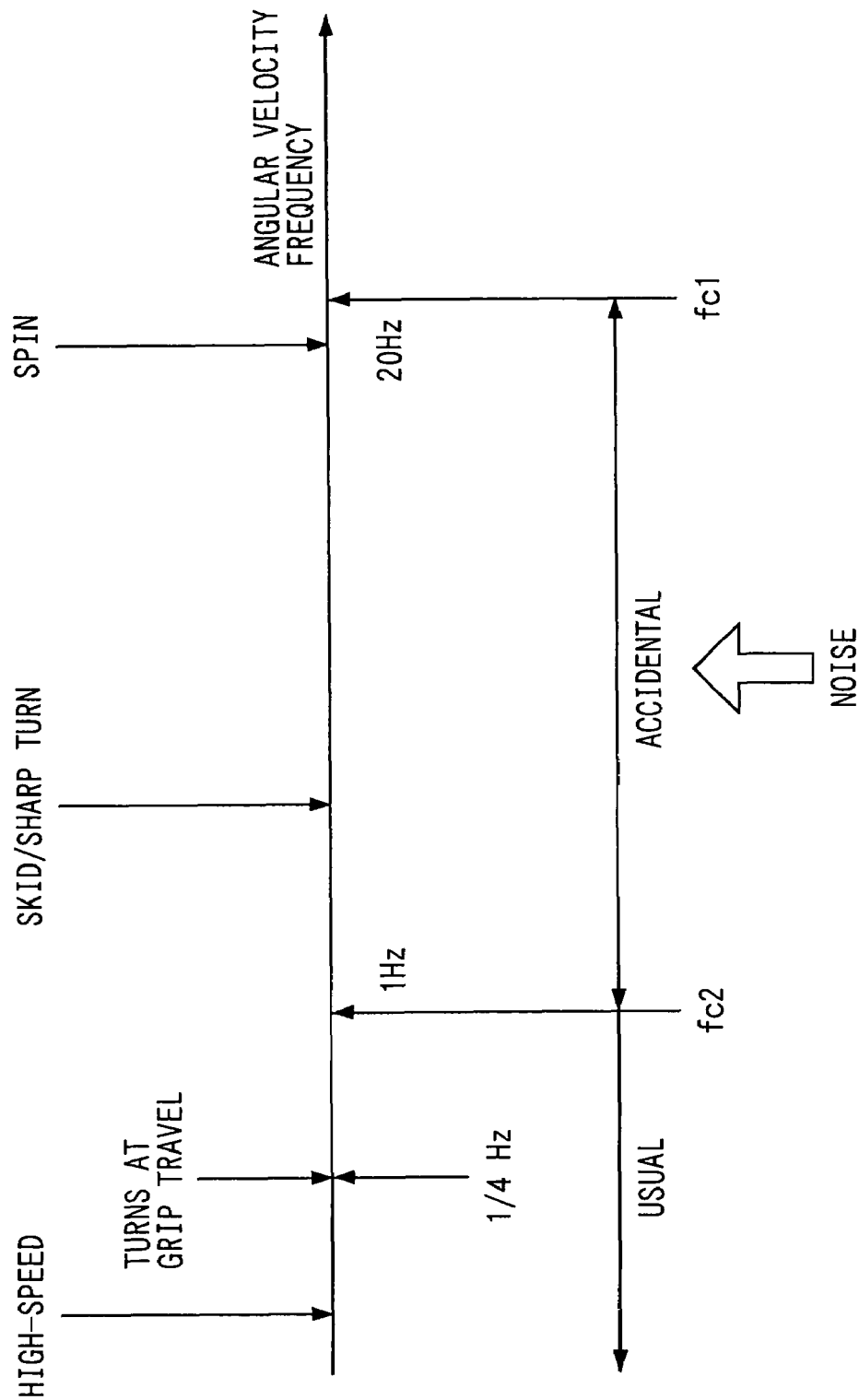
FIG. 2 is a diagram explaining schematic setting for cut-off frequencies of a first low-pass filter and a second low-pass filter.

Next, a first low-pass filter 23 will be explained below. The direct-current signal Vyo from the synchronous wave-detection unit 22 enters the first low-pass filter 23 that removes high-frequency-side components unnecessary for vehicular control from the signal Vyo to thereby form an angular velocity signal Vy (VyA, VyB), as shown in FIG. 3. This first low-pass filter 23 has a first cut-off frequency fc1. As shown in FIG. 2, typical frequencies of the signal Vy taking place during the usual traveling states fall not less than 1 Hz at most taking place at right or left turns at intersections or turning points or at U turns. (Angular changes during the usual traveling states are at most 90 degrees to 180 degrees per several seconds, so the frequency becomes relatively low.) The frequencies, further, decrease at high-speed traveling or snowy-road traveling since rapid steering operation is not done. However, relatively high frequencies (up to 10 or 30 Hz) accidentally take place at abnormal states, for instance, at vehicular internal failures, or at skids, spin, rolling, rapid steering at emergency due to external factors such as turbulent winds, or unsafe road surface. Thus, the first cut-off frequency fc1 is set to not less than 10 Hz and not more than 30 Hz (e.g., 20 Hz).

Next, a second low-pass filter 123 (123A, 123B) will be explained below. The second low-pass filter 123 is outside of the angular velocity sensor 2 (2A, 2B) in this embodiment, as shown in FIG. 1A. Namely, the signal Vy (VyA, VyB) from the first low-pass filter 23 of the angular velocity sensor 2 (2A, 2B) enters the second low-pass filter 123 (123A, 123B) to form signals Vx (VxA, VxB) (LB1, LB2 paths in FIG. 1A) for use in an abnormality-detection (failure-detection) process unit 110. The second low-pass filter 123 has a second cut-off frequency fc2 that is lower than the first cut-off frequency fc1. Therefore, the signals Vx (VxA, VxB) are decreased in their components having frequencies more than the second cut-off frequency and the first cut-off frequency. In contrast, the signals Vy (VyA, VyB) that does not enter the second low-pass filter 123 (123A, 123B) (LM1, LM2 paths in FIG. 1A) is outwardly sent to be used for vehicular control.

Here, the need of the second low-pass filter 123 will be explained below. The abnormality-detection process for the angular velocity sensors 2A, 2B need continuous detection even during the usual traveling to able to detect accidental angular velocities having high frequencies. Further, the first cut-off frequency is set by considering the accidental angular velocity detection. Thus, the accidental angular velocity region (from fc2 to fc1) becomes relatively wide, so that noises picked up in this accidental angular velocity region are superimposed on the signals Vy (VyA, VyB) detected in the usual angular velocity region (up to fc2). In particular, the levels of the angular velocity signals Vy (VyA, VyB) at high-speed traveling or snowy-road traveling are low enough to be thereby hidden by the noises. As a result, abnormalities in the sensitivity or zero-point offset of the sensors 2A, 2B cannot be sometimes detected. To solve this issue, the signals Vy are inputted to the second low-pass filter 123 having the second cut-off frequency lower than the first cut-off frequency of the first low-pass filter 23. The noises of the accidental angular velocity region are thereby interrupted so as to generate low-frequency-side angular velocity signals Vx. The generated signals Vx are thereby used in the abnormality-detection process. Even when the signals Vy are low during high-speed traveling or snowy-road traveling, sensitivity errors or zero-point offset errors can be securely detected.

In the usual angular velocity region, frequencies generated at right or left turns or U turns are up to about 1 Hz, so that the second cut-off frequency fc2 is set to 1 Hz or less. This cut-off frequency enables monitoring of outputs of angular velocity signals during high-speed traveling ($\frac{1}{50}$ to $\frac{1}{100}$ Hz) or during right or left turns or U turns at relatively low speed enabling grip traveling ($\frac{1}{4}$ to $\frac{1}{2}$ Hz). As a result, regardless of vehicle traveling speeds, the sensor sensitivity errors or zero-point offset errors can be easily detected.

Next, an internal structure of the second low-pass filter 123 will be explained with reference to FIG. 1B. In this embodiment, the second low-pass filter 123 (123A, 123B) has an amplifying function for outputted signals Vx (VxA, VxB) to include a secondary active filter 123F and an amplifier 123M. The secondary active filter 123F consists of a computation amplifier 123a, peripheral capacitors C1, C2 and resistance R1, R2. Here, the second cut-off frequency fc2 is expressed by formula $fc2=1/(2\pi \times (R1 \times R2 \times C1 \times C2)^{1/2})$. Thus, after the secondary active filter 123F interrupts noise components having frequencies higher than the second cut-off frequency from the inputted signals Vy, the amplifier 123M amplifies the outputs from the secondary active filter 123F. This suppresses amplification of the noise components to thereby enhance S/N in the low-frequency-side angular velocity signals Vx used for the abnormality-detection process.

Further, attenuation property of a low-pass filter sometimes increases as a frequency increases far from a cut-off frequency. In this embodiment, the low-frequency-side angular velocity signal Vx is generated by serially passing through the first low-pass filter 23 and then the second low-pass filter 123, so that the effect in the signal attenuation in the high-frequency range can be securely obtained. Further, when the second low-pass filter 123 has a wide range attenuation capability of significantly smoothing the high-frequency range, the output signals Vyo from the main portion 2M of the angular velocity sensor 2 can be directly sent to the second low-pass filter 123. This example is shown in dashed lines and a path LBx located in the right lower portion in FIG. 3.

Figure 5:
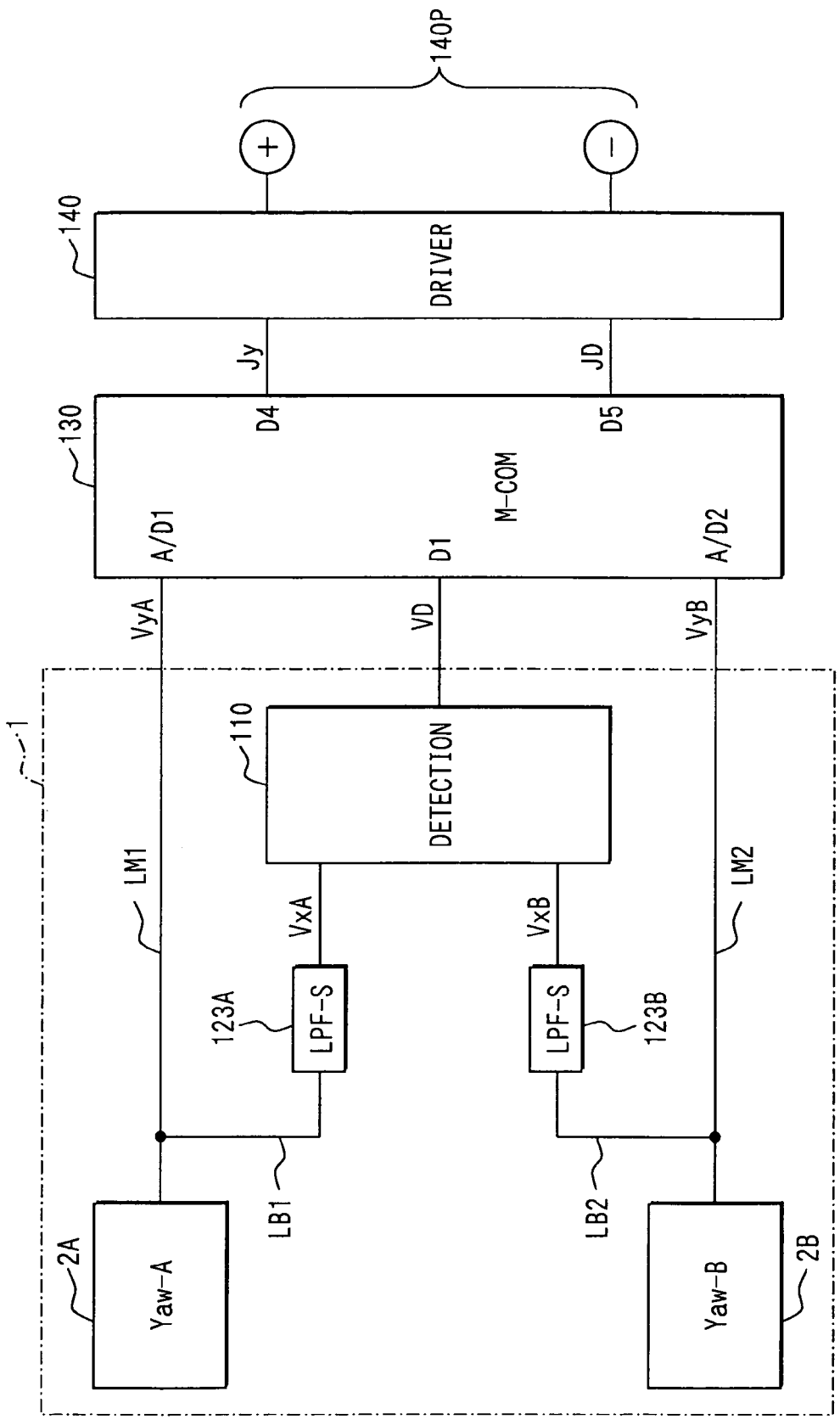
FIG. 5 is a diagram showing a circuit where a microcomputer for an output is connected to the angular velocity sensor system in FIG. 1A.

Next, the abnormality-detection process will be explained with reference to FIG. 1A. In this embodiment, the signals Vy (VyA, VyB) are outputted from the angular velocity sensor 2 (2A, 2B) in a path LM1, LM2. Further, the signals Vy (VyA, VyB) enters the second low-pass filter 123 (123A, 123B) via a path LB1, LB2 branching from the path LM1, LM2. The abnormality-detection process unit 110 includes a difference computation unit 121 that executes difference computation to the signals VxA, VxB. This enables comparison computation for the signals VxA, VxB to be executed before entering a micro-computer 130, as shown in FIG. 5. Here, the micro-computer 130 constitutes output interfaces for angular velocity signals and abnormality-detection signals. This structure increases the speed of the abnormality-detection process and decreases processing loads in the micro-computer 130. Further, most of angular velocity sensor modules is formed using a substrate where the main portion 2M and the first low-pass filter 23 are integrated and only one output terminal for outputting the signals Vy from the first low-pass filter 23 is mounted. In this case, the output path LM1, LM2 and the branching path LB1, LB2 are drawn out from the output terminal, so that design change in the substrate becomes unnecessary.

In this embodiment, the difference computation unit 121 is a differential amplifier and the output of the unit 121 enters a window comparator 113. When no abnormality is present, both angular velocity sensors 2A, 2B output low-frequency-side angular velocity signals VxA, VyB equivalent to each other. Difference computation for both the signals VxA, VyB cancels waveforms mutually. Output SK of the differential amplifier 121 thereby exhibits waveforms flat in the neutral point. In contrast, when either of outputs of the sensors 2A, 2B is abnormal, difference is generated between the angular velocity signals VxA, VxB to thereby interrupt the canceling balance and then shift amplitude width of the output SK of the differential amplifier 121, from the neutral point. Thus, the relevant signal output Sk is inputted to the window comparator 113 having the reference voltage region Vref2, Vref3 including the neutral point. Then, whether the signal SK is within the specified region is outputted from the window comparator 113 as abnormality-detection signals VD.

As shown in FIG. 5, the angular velocity signals VyA, VyB are inputted to A/D converting ports A/D1, A/D2 as analog waveform signals, respectively. Further, the abnormality-detection signal VD is inputted to a data port D1 as a binary level signal. The micro-computer 130 generates final angular velocity data Jy using the signals VyA, VyB and abnormality-detection data JD based on the signals VD. Both data Jy, JD are outputted to a serial-communication driver 140 as serial data, and outwardly outputted from a serial port 140P after being synthesized with carrier waves.

In this embodiment, the second low-pass filters 123A, 123B are individually provided in the paths LB1, LB2. The signals VxA, VxB that have passed through the second low-pass filter 123A, 123B are inputted to the difference computation unit 121. For instance, the difference computation can be applied to the signals VyA, VyB before entering the second low-pass filters 123A, 123B, and the resultant differential signals can be inputted to the second low-pass filter 123A, 123B. However, this method is inferior to this embodiment where the noise is removed before the difference computation. It is because S/N in the low-frequency-side angular velocity signals can be increased and accuracy in abnormality detection such as sensitivity error detection is thereby increased.

Second Embodiment

Figure 6:
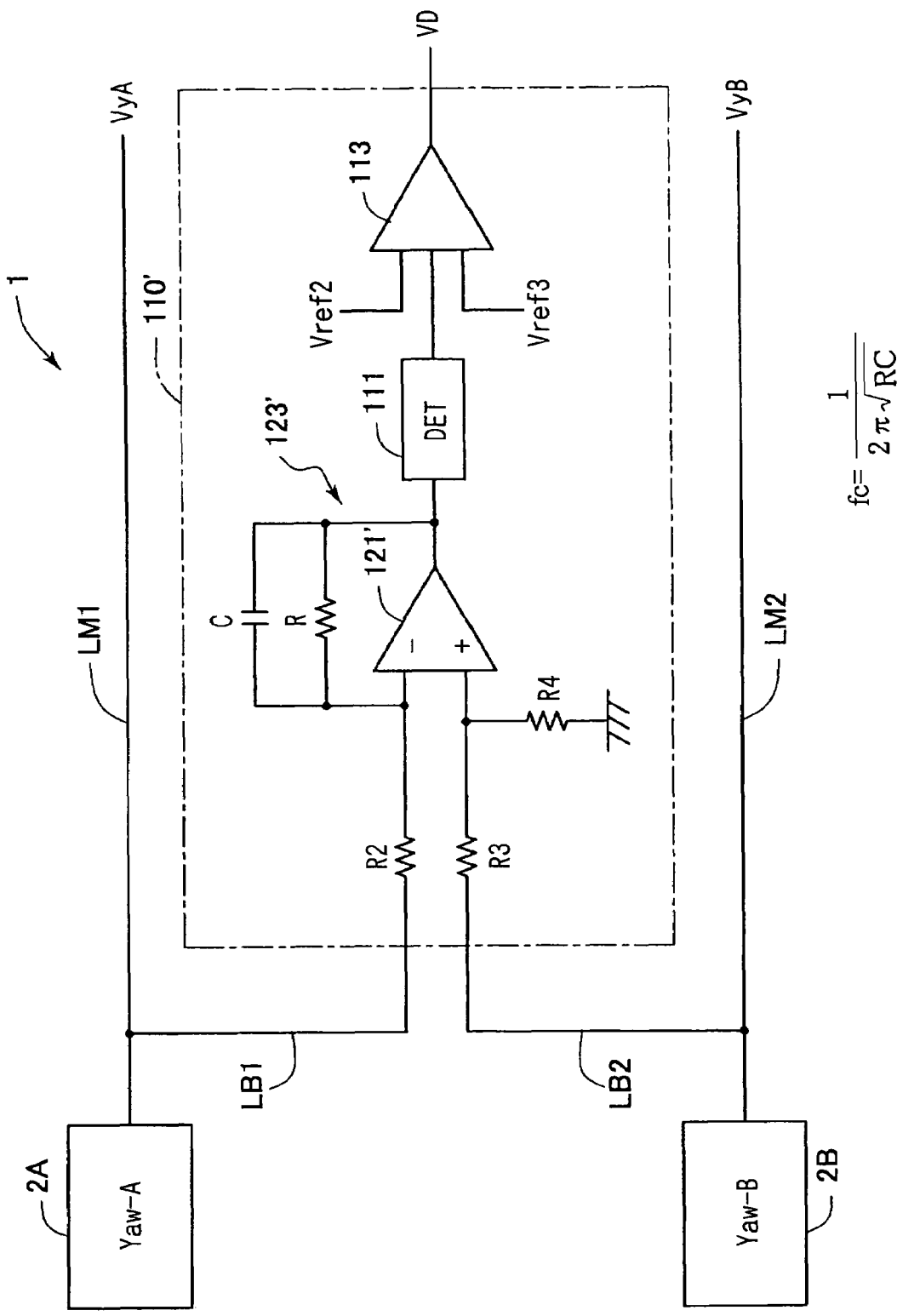
FIG. 6 is a block diagram of an angular velocity sensor system according to a second embodiment of the present invention.

A second embodiment will be explained with reference to FIG. 6. Here, an active filter 123' is substituted for the difference computation unit 121 in the first embodiment. The active filter 123' receives the signals VyA, VyB from the two angular velocity sensors 2A, 2B for the difference computation, and serves also as the two second low-pass filters 123A, 123B. Therefore, the second low-pass filters and the difference computation unit become common to thereby simplify the circuit. The active filter 123' is a primary filter to consist of a computation amplifier 121', and peripheral resistances R1 to R4 and capacitor C. Further, the active filter 123' also serves as a differential amplifier receiving the signals VyA, VyB, and its gain is determined by values of the resistance R1 to R4.

Third Embodiment

Figure 7:
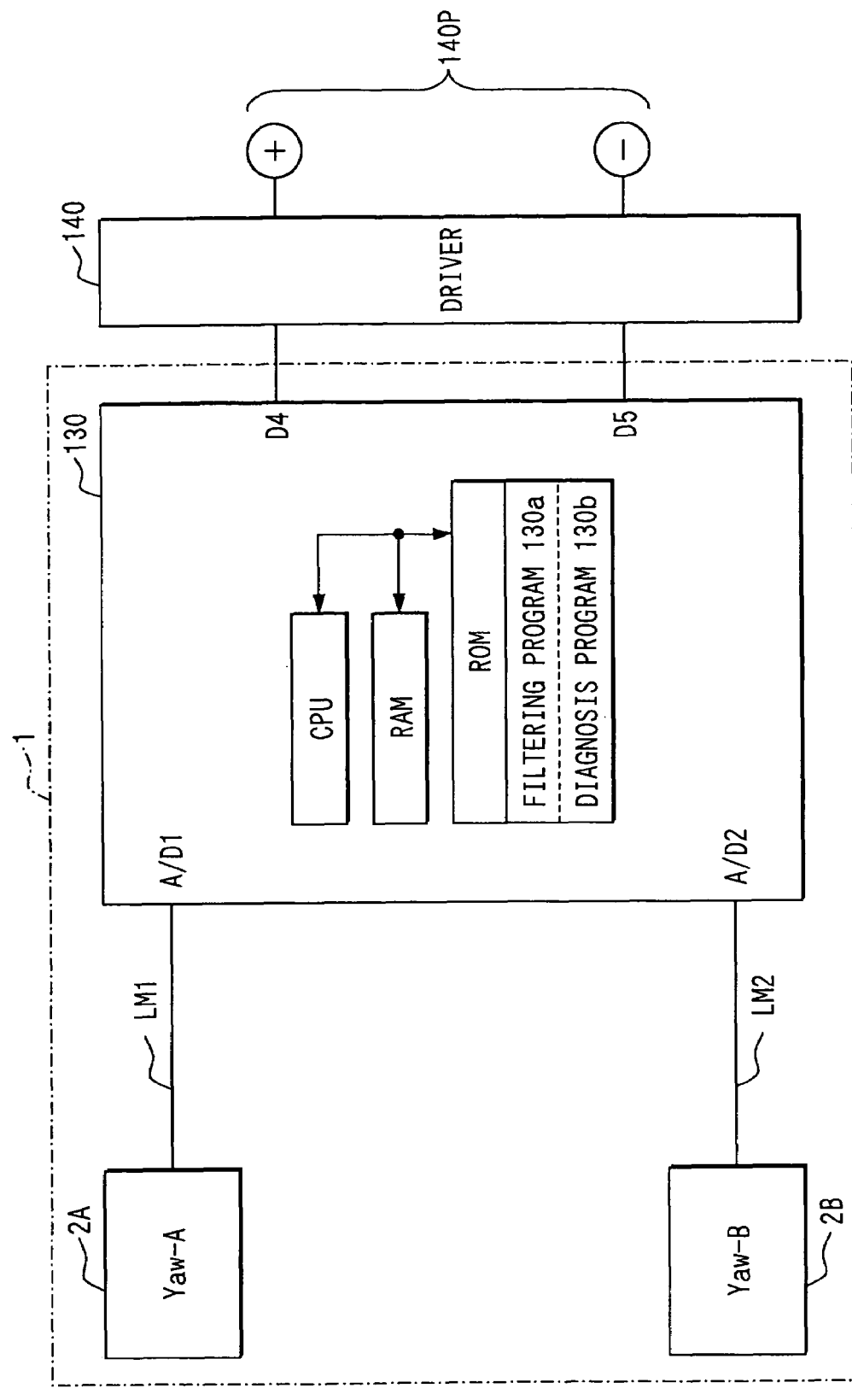
FIG. 7 is a block diagram of an angular velocity sensor system according to a third embodiment of the present invention.

A third embodiment will be explained with reference to FIG. 7. Here, a micro-computer 130 serves as the two second low-pass filters 123A, 123B in the first embodiment, using a software program. In detail, the angular velocity signals VyA, VyB are inputted from A/D converting ports A/D1, A/D2 as digital waveforms, respectively. A CPU of the micro-computer 130 executes, to the inputted digital waveforms, a filtering program 130a based on a known high-speed Fourier transform algorism. Signal components of the second cut-off frequency fc2 or more are thereby filtered. Further, difference computation for the waveform data (i.e., waveforms of the low-frequency-side angular velocity signals) after filtering is also executed by the micro-computer 130 using a diagnosis comparison output program 130b.

Fourth Embodiment

Figure 8:
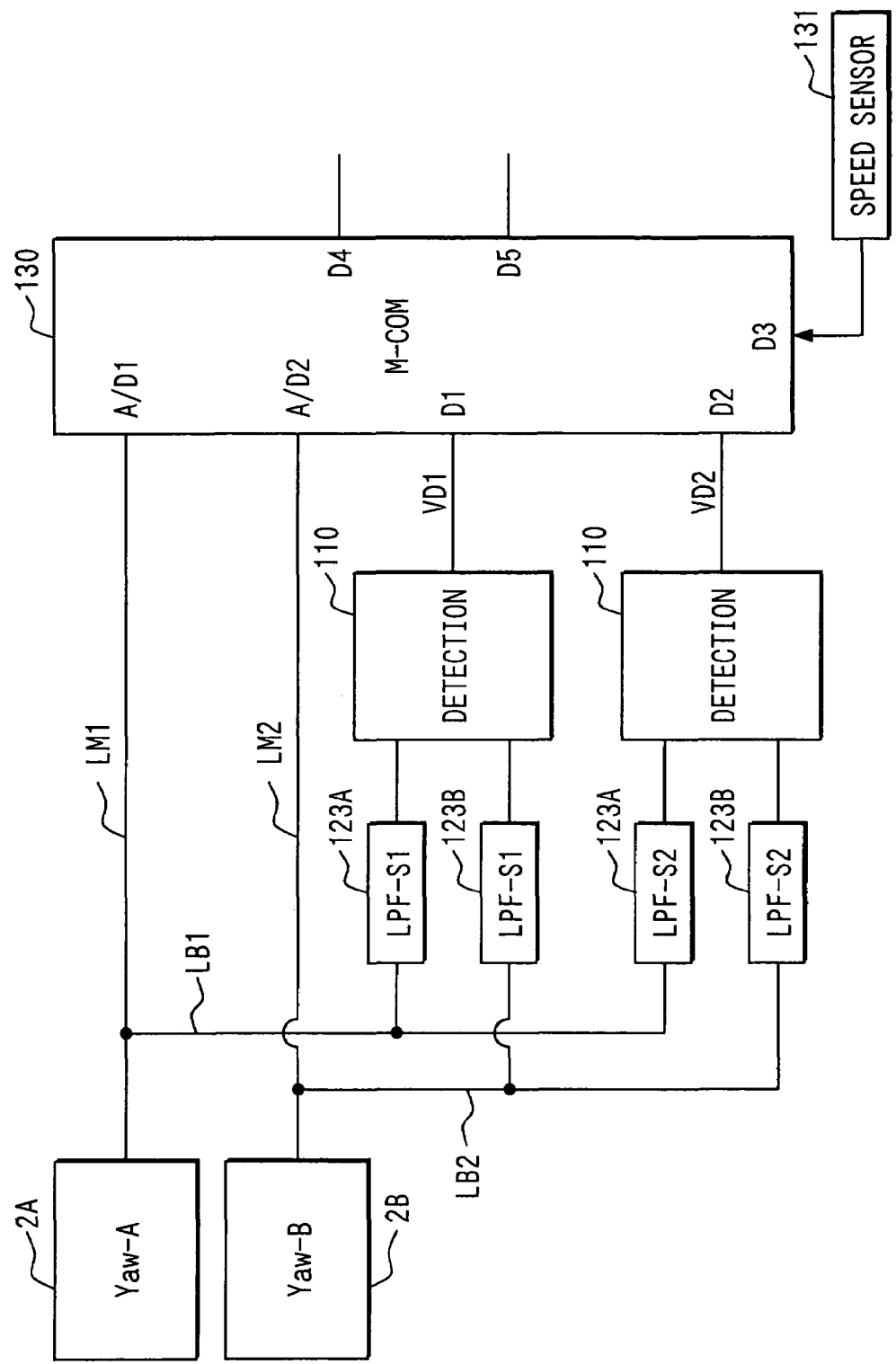
FIG. 8 is a block diagram of an angular velocity sensor system according to a fourth embodiment of the present invention.

A fourth embodiment will be explained with reference to FIG. 8. Two second low-pass filters 123 having two different cut-off frequencies from each other are provided for one angular velocity sensor 2. Namely, total four second low-pass filters 123A, 123B are provided for the two sensors 2A, 2B, as shown in FIG. 8. Here, a micro-computer 130 selects an input port D1, D2 interfacing with the second low-pass filter 123A, 123B corresponding to the present traveling speed of the vehicle by considering speed signals from a vehicle speed sensor 131. Further, not only two but more than two second low-pass filters can be provided.

This embodiment can be properly used for the following state. In the first embodiment, the second cut-off frequency fc2 is set to cover angular velocities of ¼ to ½ Hz generated at right or left turns or U turns at relatively low speeds in grip traveling. When output levels of the angular velocity become extremely low in high-speed traveling, noises in the frequencies in the grip traveling may adversely affect the sensitivity error detection or the like. To solve this issue, based on the vehicle speeds, the second cut-off frequency fc2 is shifted to another frequency. In detail, when the vehicle speed is relatively low (e.g., less than 60 km/h in the grip traveling), the second cut-off frequency is set to a relatively high frequency (e.g., between ¼ Hz and 1 Hz). In contrast, when the vehicle speed is relatively high (e.g., not less than 60 km/h), the second cut-off frequency is set to a relatively low frequency (e.g., between ¹⁄₁₀ Hz and ¼ Hz).

It will be obvious to those skilled in the art that various changes may be made in the above-described embodiments of the present invention. However, the scope of the present invention should be determined by the following claims.

What is claimed is:

1. An angular velocity sensor system that is provided in a vehicle and includes at least two angular velocity sensors that individually output angular velocity signals, the system executing abnormality detection of the angular velocity sensors based on comparison between states of the outputted angular velocity signals, the system comprising:
    a first low-pass filter that is provided before an angular velocity signal of each of the angular velocity sensors is outputted, wherein the first low-pass filter includes a first cut-off frequency and removes, from an angular velocity signal, a high-frequency-side component unnecessary for vehicular control;
    a second low-pass filter for each angular velocity sensor that includes a second cut-off frequency that is lower than the first cut-off frequency;
    an output unit of each angular velocity sensor that outputs an angular velocity signal, which has passed through the first low-pass filter and has not passed through the second low-pass filter; and
    an abnormality-detection processing unit that executes the abnormality detection using a low-frequency-side angular velocity signal of each angular velocity sensor that has passed through the second low-pass filter in said comparison to determine the abnormality of the two angular velocity sensors to thereby decrease the frequency component of the angular velocity signal whose frequency is between the first cut-off frequency and the second cut-off frequency.

2. The angular velocity sensor system of claim 1, wherein the second cut-off frequency is set so that a given frequency band passes and a certain frequency band is intercepted from passing, wherein the given frequency band of an angular velocity signal is generated when a turn of the vehicle is conducted during grip traveling of the vehicle, and wherein the certain frequency band of an angular velocity signal is expected to be generated when an abnormality is present in the vehicle, and is higher than the given frequency band.

3. The angular velocity sensor system of claim 1, wherein the first cut-off frequency is set from 10 Hz to 30 Hz, and the second cut-off frequency is set to 1 Hz or less.

4. The angular velocity sensor system of claim 1,
wherein the second low-pass filter includes a function for amplifying the low-frequency-side angular velocity signal that has passed through the second low-pass filter.

5. The angular velocity sensor system of claim 1,
wherein the angular velocity signal that has passed through the first low-pass filter is inputted to the second low-pass filter.

6. The angular velocity sensor system of claim 1,
wherein two of a first angular velocity sensor and a second angular velocity sensor are included in the at least two angular velocity sensors,
wherein an abnormality-detection path branches from each of output paths of the angular velocity signals of the two angular velocity sensors,
wherein the angular velocity signals enter the second low-pass filter via the abnormality-detection paths, and
wherein the abnormality-detection processing unit includes a difference computation unit that executes a difference computation with respect to the angular velocity signals that have passed through the abnormality-detection paths.

7. The angular velocity sensor system of claim 6,
wherein the second low-pass filter is individually provided to each of the abnormality-detection paths of the two angular velocity sensors, and
wherein the angular velocity signals that have passed the second low-pass filters enter the difference computation unit.

8. The angular velocity sensor system of claim 6,
wherein the difference computation unit is an active filter that serves also as the second low-pass filter and receives the angular velocity signals of the two angular velocity sensors.

9. The angular velocity sensor system of claim 1, further comprising:
a micro-computer to which the angular velocity signals of the angular velocity sensors are inputted,
wherein the second low-pass filter is formed as a software program within the micro-computer.

10. The angular velocity sensor system of claim 1,
wherein the second cut-off frequency is changed based on a traveling speed of the vehicle.

* * * * *